United States Patent Office 3,518,289
Patented June 30, 1970

3,518,289
PROCESS FOR PREPARING BICYCLOTETRA-SILAZANES AND TRICYCLOTETRASILAZANE COMPOUNDS
Christopher A. Pearce, Cowbridge, Glamorgan, and Norman C. Lloyd, Radyr, Cardiff, Glamorgan, Wales, assignors to Midland Silicones Limited, Reading, Berkshire, England
No Drawing. Filed May 21, 1968, Ser. No. 730,937
Claims priority, application Great Britain, May 26, 1967, 24,694/67
Int. Cl. C07f 7/02
U.S. Cl. 260—448.2                4 Claims

ABSTRACT OF THE DISCLOSURE

Organosilazane materials are prepared by heating a bicyclotetrasilazane to produce mixtures of tricyclotetrasilazanes and silazane polymers. These compounds are useful in the formation of coating compositions.

---

This invention relates to a process for preparing organosilazane materials containing silicon-nitrogen linkages.

More particularly, this invention provides a process for preparing organosilazane materials comprising heating to a temperature of at least 250° C. a bicyclotetrasilazane of the general formula:

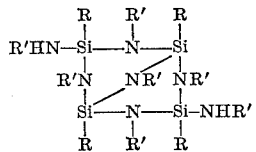

wherein each R represents an alkyl radical containing less than 6 carbon atoms, a monocyclic aryl radical, a vinyl radical or an allyl radical and each R' represents an alkyl radical containing less than 6 carbon atoms or an allyl radical, whereby there is obtained a mixture of a tricyclotetrasilazane of the structural formula:

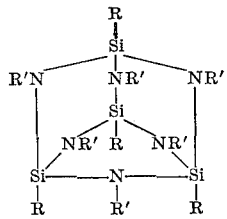

and a silazane polymer containing a repeating unit of the general formula:

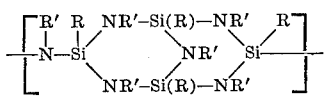

wherein each R represents an alkyl radical containing less than 6 carbon atoms, a monocyclic aryl radical, a vinyl radical or an allyl radical and each R' represents an alkyl radical containing less than 6 carbon atoms or an allyl radical.

The bicyclotetrasilazane illustrated above can exist in the form of three isomers depending on the relative positions of the —NHR' groups attached to the silicon atoms. Thus in one isomer, the two silicon-bonded NHR' radicals can be positioned spatially to be in the closest proximity, or in a further isomer the R radicals attached to the same two silicon atoms can be in that position. In the third isomer, the —NHR' radicals attached to one silicon atom can occupy the position of closest proximity to the R radical of the other silicon atom. We have found that two products are obtainable according to the process of this invention depending on the particular isomers which are reacted. When that isomeric form is employed in which the —NHR' groups are in their closest possible proximity, and in particular where R' represents the ethyl radical, heating of the isomer will produce a tricyclotetrasilazane of the structure:

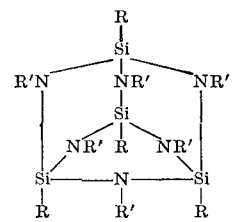

The temperature at which this compound is formed will depend on the nature of the R and R' radicals. For example, when the R radicals are methyl radicals and the R' radicals are ethyl radicals, the corresponding product is obtained at about 330° C. Preparation of the compounds wherein R and R' are larger hydrocarbon radicals will require correspondingly increased temperatures and the preferred compounds are those in which R and R' each are selected from alkyl radicals containing less than 6 carbon atoms.

These tricyclotetrasilazanes are novel materials and are to be considered as within the scope of this invention.

Heating of the isomers wherein the —NHR groups are not in their closest possible proximity will lead to the formation of a silazane polymer containing a repeating unit of the general formula:

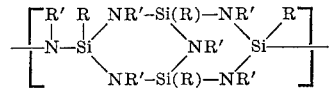

wherein R and R' are as hereinbefore defined. These polymers are novel and are also included within the scope of this invention.

Although the silazane polymer can be obtained by heating the appropriate isomers, it is preferred to carry out the heating step in the presence of a catalyst such as sulphuric acid or ammonium sulphate which is capable of functioning as a proton source at the reaction temperature. The use of such a catalyst reduces the temperature required and the time of reaction and also favors the formation of the polymer when mixtures of the isomers are employed as the reactant.

One method for the preparation of the bicyclotetrasilazanes employed as the reactants in the process of the present invention is described in our co-pending application No. 730,940 entitled Organosilicon Compounds and filed concurrently herewith. Such a method provides a product which is a mixture of the three isomeric forms and separation of the three isomers is difficult and tedious. Mixtures of the isomers can, however, be employed in the process of this invention. When such mixtures are used the production of the tricyclotetrasilazane can be accompanied by the formation of a proportion of the silazane polymeric material. It is, however, possible to prepare the polymeric silazane in the substantial absence of the tricyclotetrasilazane if an acid catalyst as hereinbefore described is employed.

If desired, the process can be performed in the presence of an organic solvent. The use of a solvent is not, however, essential and, in view of the relatively high temperatures employed, is preferably avoided.

The silazane polymers of this invention vary from liquids to brittle resins and are useful in the formation of coating compositions.

The following examples are illustrative of the invention and are not being considered as limiting the scope of the invention.

EXAMPLE 1

N - pentaethyl-bis-(ethylamino)tetramethylbicyclotetrasilazane $Me_4Si_4(NEt)_5(NHEt)_2$ (5.8 g.) was heated at 325 to 328° for 200 hours in an atmosphere of dry argon. Ethylamine was slowly evolved and the composition of the pyrolysate was followed by gas chromatography analysis, which showed that after 150 hours' maximum conversion (10%) to the tricyclotetrasilazane had occurred, although conversion of the other isomers to polymer was still taking place. Separation of the mixture by preparative gas chromatography yielded a pure sample of N-hexaethyltetramethyltricyclotetrasilazane $Me_4Si_4(NEt)_6$ as a colorless crystalline solid M.P. 165°.

Calcd. for $C_{16}H_{42}N_6Si_4$ (percent): C, 44.6; H, 9.8; N, 19.5; Si, 26.1; M, 430. Found (percent): C, 44.1; H, 9.6; N, 19.7; Si, 25.7; M (mass spectrum), 430.

The structure of the compound was confirmed by infrared and NMR spectroscopy.

EXAMPLE 2

The bicyclotetrasilazane $Me_4Si_4(NEt)_5(NHEt)_2$ (6.4 g.) used in Example 1 was heated at 325° for 250 hours in the presence of ammonium sulphate (0.089 g.). Ethylamine was evolved and the product was a light brown viscous liquid polymer.

That which is claimed is:

1. A process for preparing organosilazane materials comprising heating to a temperature of at least 250° C. a bicyclotetrasilazane of the general formula:

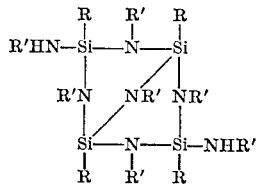

wherein each R represents an alkyl radical containing less than 6 carbon atoms, a monocyclic aryl radical, a vinyl radical or an allyl radical and each R' represents an alkyl radical containing less than 6 carbon atoms or an allyl radical, whereby there is obtained a mixture of a tricyclotetrasilazane of the structural formula:

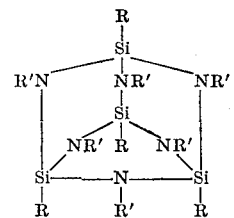

and a silazane polymer containing a repeating unit of the general formula:

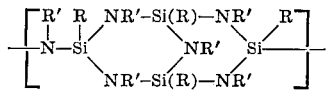

wherein each R represents an alkyl radical containing less than 6 carbon atoms, a monocyclic aryl radical, a vinyl radical or an allyl radical and each R' represents an alkyl radical containing less than 6 carbon atoms or an allyl radical.

2. A process for preparing organosilazane materials as claimed in claim 1 wherein each R and each R' are selected from alkyl radicals containing less than 6 carbon atoms.

3. A process for preparing organosilazane materials as claimed in claim 1 wherein there is also present a catalyst which functions as a proton source at the reaction temperature.

4. A process for preparing organosilazane materials as claimed in claim 1 wherein the tricyclotetrasilazane is N-hexaethyltetramethyl-tricyclotetrasilazane.

References Cited

UNITED STATES PATENTS

| | | | |
|---|---|---|---|
| 3,297,592 | 1/1967 | Fink | 260—448.2 X |
| 3,393,218 | 7/1968 | Van Wazer et al. | 260—448.2 |
| 3,414,584 | 12/1968 | Fink | 260—448.2 |

HELEN M. McCARTHY, Primary Examiner

W. F. W. BELLAMY, Assistant Examiner

U.S. Cl. X.R.

260—46.5